(12) United States Patent
Feng et al.

(10) Patent No.: US 8,831,422 B2
(45) Date of Patent: Sep. 9, 2014

(54) METHOD FOR GENERATING A PROBE PULSE AND COHERENT OPTICAL TIME DOMAIN REFLECTOMETER

(71) Applicant: Huawei Technologies Co., Ltd., Shenzhen (CN)

(72) Inventors: Zhiyong Feng, Shenzhen (CN); Shaofeng Qiu, Chengdu (CN); Yijia Wei, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 13/728,686

(22) Filed: Dec. 27, 2012

(65) Prior Publication Data

US 2013/0114954 A1   May 9, 2013

Related U.S. Application Data

(63) Continuation of application No. PCT/CN2011/073376, filed on Apr. 27, 2011.

(30) Foreign Application Priority Data

Jun. 30, 2010  (CN) .......................... 2010 1 0219146

(51) Int. Cl.
*H04B 10/071* (2013.01)
*G01M 11/00* (2006.01)
(52) U.S. Cl.
CPC .................................. *H04B 10/071* (2013.01); *G01M 11/3127* (2013.01)
USPC .................................. 398/28; 398/13; 398/21

(58) Field of Classification Search
CPC .......... H03B 10/071; G01D 5/35358–5/35367
USPC ................................................. 398/13, 21, 28
See application file for complete search history.

(56) References Cited

U.S. PATENT DOCUMENTS

| 6,122,043 A | 9/2000 | Barley |
| 8,384,909 B2 * | 2/2013 | Yun et al. ...................... 356/497 |

(Continued)

FOREIGN PATENT DOCUMENTS

| CN | 1330266 A | 1/2002 |
| CN | 1465966 A | 1/2004 |

(Continued)

OTHER PUBLICATIONS

Extended European Search Report received in Application No. 11780136.5-1860 mailed Jul. 22, 2013, 28 pages.

(Continued)

*Primary Examiner* — Nathan Curs
(74) *Attorney, Agent, or Firm* — Slater & Matsil, L.L.P.

(57) ABSTRACT

The present invention relates to the field of communication transmission, and in particular, to a method for generating a probe pulse and a coherent optical time domain reflectometer. The coherent optical time domain reflectometer includes: a control unit, configured to generate a first pulse signal and a second pulse signal which have a same period T, where the second pulse signal lags behind the first pulse signal, and T satisfies T≥t+2L/C; a driving unit, configured to generate a frequency change driving signal according to the first pulse signal; a continuous light laser device, configured to generate, as driven by the frequency change driving signal, continuous light having a changing frequency and an unchanging frequency spectrum width; and a probe pulse generating unit, configured to modulate the continuous light according to the second pulse signal to generate a probe pulse.

12 Claims, 4 Drawing Sheets

(56) References Cited

U.S. PATENT DOCUMENTS

| | | | |
|---|---|---|---|
| 8,750,703 B2* | 6/2014 | Effenberger | 398/16 |
| 2003/0007142 A1* | 1/2003 | Hotate et al. | 356/73.1 |
| 2004/0208523 A1* | 10/2004 | Carrick et al. | 398/32 |
| 2005/0196174 A1* | 9/2005 | Evangelides et al. | 398/151 |
| 2009/0027656 A1 | 1/2009 | Zhang et al. | |
| 2010/0290035 A1 | 11/2010 | Wang et al. | |
| 2011/0194853 A1 | 8/2011 | Liu et al. | |

FOREIGN PATENT DOCUMENTS

| | | | |
|---|---|---|---|
| CN | 101226100 A | 7/2008 | |
| CN | 101729141 A | 6/2010 | |
| EP | 1912050 A1 | 4/2008 | |
| GB | 2441154 A | 2/2008 | |
| JP | 2009/002898 A | 1/2009 | |
| JP | 2009/0257973 A | 11/2009 | |

OTHER PUBLICATIONS

Sumida, Masatoyo, "OTDR Performance Enhancement Using a Quaternary FSK Modulated Probe and Coherent Detection," IEEE Photonics Technology Letters, vol. 7, No. 3, Mar. 1995, 3 pages.

Weid, J.P. et al., "On the Characterization of Optical Fiber Network Components with Optical Frequency Domain Reflectometry," Journal of Lightwave Technology, vol. 15, No. 7, Jul. 1997, 11 pages.

Izumita, H., et al., "Fading Noise Reduction in Coherent OTDR," IEEE Photonics Technology Letters, vol. 4, No. 2, Feb. 1992, 3 pages.

International Search Report received in International Application No. PCT/CN2011/073376, Applicant: Huawei Technologies Co., Ltd. et al., mailed Aug. 4, 2011, 3 pages.

Written Opinion of the International Searching Authority received in International Application No. PCT/CN2011/073376, Applicant: Huawei Technologies Co., Ltd. et al., mailed Aug. 4, 2011, 3 pages.

Chinese Search Report received in Application No. 201010219146.7 mailed Apr. 15, 2013, 5 pages.

* cited by examiner

METHOD FOR GENERATING A PROBE PULSE AND COHERENT OPTICAL TIME DOMAIN REFLECTOMETER

This application is a continuation of International Application No. PCT/CN2011/073376, filed on Apr. 27, 2011, which claims priority to Chinese Patent Application No. 201010219146.7, filed on Jun. 30, 2010, both of which are hereby incorporated by reference in their entireties.

TECHNICAL FIELD

The present invention relates to the field of communication transmission, and in particular to a method for generating a probe pulse and a coherent optical time domain reflectometer.

BACKGROUND

A COTDR (Coherent Optical Time Domain Reflectometer, coherent optical time domain reflectometer) and an OTDR are usually used for locating a line fault (such as fiber cut) of an optical fiber cable. Both the OTDR and the COTDR send a probe pulse to the fiber periodically, where the probe pulse undergoes Rayleigh scattering at each point in the fiber. The COTDR and OTDR then extract a Rayleigh-scattered signal from a received optical signal scattered back from the fiber, and then perform analysis according to the Rayleigh-scattered signal, to implement fiber fault location. Compared with the common OTDR, the COTDR has advantages such as long location distance. However, because a coherent technology is adopted to receive and process the Rayleigh-scattered signal, it is required that a line width of a light source of the COTDR should be narrow, and usually the line width is required to be within a range of 10 KHz to 100 KHz.

Since the optical wave of the probe pulse has a single frequency component, a Rayleigh-scattered signal scattered back from each point in the fiber has a same frequency, which thereby causes Rayleigh-scattered signals scattered back from some points to undergo destructive interference or constructive interference when arriving at the OTDR or COTDR. As a result, the Rayleigh-scattered signals demonstrate a noise-like characteristic, that is, present certain randomness, and such a noise is referred to as a coherent fading noise. The coherent fading noise causes the COTDR and OTDR to be incapable of distinguishing a fiber fault, and thereby fail to accurately locate the fiber fault. Therefore, such a noise-like characteristic needs to be reduced by certain means, so as to improve the fiber fault resolution and location accuracy of the COTDR and OTDR.

The prior art provides a solution of directly adopting a technology of changing a drive pulse shape of a laser device to reduce the coherent fading noise of an OTDR system, which specifically is that a drive control circuit generates a slowly changing modulation pulse to drive a pulse modulator to perform modulation control on the laser device, so that a probe pulse output by the laser device include optical waves of different frequency components, thereby achieving an objective of reducing the coherent fading noise.

However, the prior art results in broadening of a frequency spectrum of the optical waves output by the light source, which does not meet a requirement of the COTDR for narrow line width of the light source. When being applied to the COTDR, the prior art not only fails to improve the fiber fault resolution and location accuracy of the COTDR, but also degrades working performance of the COTDR.

SUMMARY OF THE INVENTION

The present invention provides a coherent optical time domain reflectometer, which includes a control unit, a driving unit, a continuous light laser device and a probe pulse generating unit, where the control unit is configured to generate a first pulse signal and a second pulse signal which have a same period T, where the second pulse signal lags behind the first pulse signal, and the period T of the first pulse signal and of the second pulse signal satisfies $T \geq t+2L/C$, where t is a light source adjustment time of the continuous light laser device, L is a length of a fiber to be detected, and C is a propagation velocity of an optical wave in the fiber, the driving unit is configured to generate a frequency change driving signal according to the first pulse signal, the continuous light laser device is configured to generate, as driven by the frequency change driving signal, continuous light which has a changing frequency and an unchanging frequency spectrum width, and the probe pulse generating unit is configured to modulate the continuous light according the second pulse signal, and generate a probe pulse.

The present invention further provides a method for generating a probe pulse, including generating a first pulse signal and a second pulse signal which have a same period T, where the second pulse signal lags behind the first pulse signal, and the period T of the first pulse signal and of the second pulse signal satisfies $T \geq t+2L/C$, where t is a light source adjustment time of a continuous light laser device, L is a length of a fiber to be detected, and C is a propagation velocity of an optical wave in the fiber, generating a frequency change driving signal according to the first pulse signal, driving the continuous light laser device by using the frequency change driving signal to make the continuous light laser device generate continuous light which has a changing frequency and an unchanging frequency spectrum width, and modulating the continuous light according to the second pulse signal, to obtain a probe pulse.

Through the coherent optical time domain reflectometer provided in the embodiments of the present invention, the frequency of the continuous light output by the continuous light laser device is controlled, which makes each probe pulse include an optical wave of a single frequency component while optical waves of different probe pulses have different frequencies, rather than makes the probe pulse, which is output by the continuous light laser device, include optical waves of different frequency components. The period T of the first pulse signal and of the second pulse signal is controlled to satisfy $T \geq t+2L/C$, which makes a next probe pulse be sent after an optical signal which is scattered and/or reflected at each point of the fiber and corresponds to one probe pulse returns to the coherent optical time domain reflectometer, and thereby prevents superposition of scattered and/or reflected optical signals corresponding to different probe pulses. Therefore, the coherent fading noise is effectively reduced, and meanwhile broadening of the frequency spectrum of the optical wave output by the continuous light laser device is not caused, which thereby greatly improves the fiber fault resolution and location accuracy of the coherent optical time domain reflectometer.

BRIEF DESCRIPTION OF THE DRAWINGS

To illustrate technical solutions in embodiments of the present invention or in the prior art more clearly, accompanying drawings required for use in the embodiments are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

Technical solutions in embodiments of the present invention will be clearly and completely described in the following with reference to accompanying drawings. It is obvious that the embodiments to be described are only part rather than all of the embodiments of the present invention. All other embodiments obtained by persons of ordinary skill in the art based on the embodiments of the present invention without creative efforts shall fall within the protection scope of the present invention.

Figure 1:
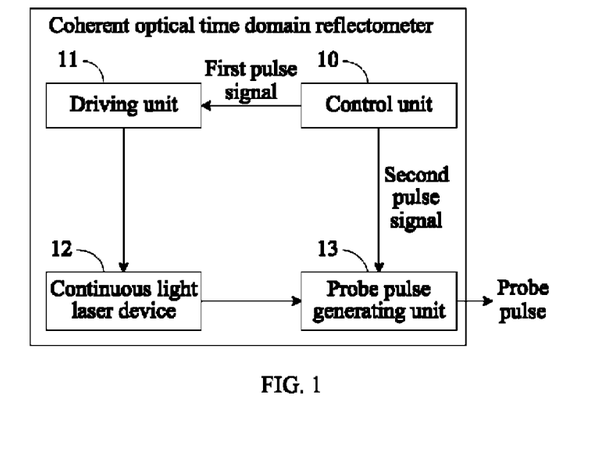
FIG. 1 is a structural diagram of a coherent optical time domain reflectometer according to a first embodiment of the present invention.

An embodiment of the present invention provides a coherent optical time domain reflectometer, a structure of which is as shown in FIG. 1. The apparatus includes a control unit 10, a driving unit 11, a continuous light laser device 12, and a probe pulse generating unit 13.

The control unit 10 is configured to generate a first pulse signal and a second pulse signal which have a same period T, where the second pulse signal lags behind the first pulse signal.

While generating the first pulse signal and the second pulse signal, the control unit 10 may also specifically control the period T of the first pulse signal and of the second pulse signal to satisfy $T \geq t+2L/C$, where L is a length of a fiber to be detected, C is a propagation velocity of an optical wave in the fiber, and t is a light source adjustment time of the continuous light laser device. The light source adjustment time is time spent by a laser device from stably outputting light of one frequency to stably outputting light of another frequency, and is an intrinsic description parameter of each laser device.

When generating the two pulse signals, the control unit 10 may also specifically control the second pulse signal to lag behind the first pulse signal by at least one t.

The driving unit 11 is configured to generate a frequency change driving signal according to the first pulse signal. Because the frequency change driving signal is applied to the laser device to control the frequency of the continuous light output by the laser device, the frequency of the continuous light output by the laser device can be made different, as long as the frequency change driving signal becomes different. Therefore, as triggered by the first pulse signal, the driving unit 11 may regularly change the output frequency change driving signal, for example, may change the frequency change driving signal in a linear ascending or linear descending order. Definitely, as triggered by the first pulse signal, the driving unit 11 may also change the output frequency change driving signal randomly.

The continuous light laser device 12 outputs, under control of the frequency change driving signal generated by the driving unit 11, continuous light which has a changing frequency and an unchanging frequency spectrum width.

Because the frequency change driving signal is changed as triggered by the first pulse signal, that is, when a pulse of the first pulse signal is detected, the frequency change driving signal which is generated as triggered by a previous pulse is changed, and the changed frequency change driving signal remains unchanged until the arrival of a next pulse of the first pulse signal. Therefore, in a period of the first pulse signal, the continuous light which is output by the continuous light laser device 12 in a stable state has a single frequency and an unchanging frequency spectrum width, while, corresponding to different periods of the first pulse signal; the continuous light output by the continuous light laser device has different frequencies.

By changing the temperature of the continuous light laser device 12, the current/voltage of a driving circuit or the length of a resonant cavity of the continuous light laser device 12, the frequency change driving signal makes the frequency of the continuous light, which is output by the continuous light laser device 12, change.

The probe pulse generating unit 13 modulates, according to the second pulse signal generated by the control unit 10, the continuous light output by the continuous light laser device 12, and generates a probe pulse. When modulating the continuous light, the probe pulse generating unit 13 may adopt a simple OOK (ON-OFF Keying, on-off keying) modulation scheme, where the second pulse signal decides time with and without light, or time with high optical power and low optical power in a modulation period.

Figure 2:
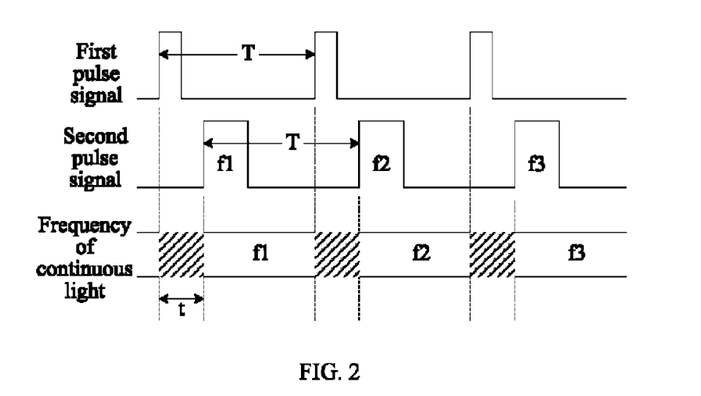
FIG. 2 is a schematic diagram of a principle for generating a probe pulse according to an embodiment of the present invention.

Referring to FIG. 2, a process of generating a probe pulse by the coherent optical time domain reflectometer provided in the embodiment of the present invention is further illustrated.

A time sequence relationship between the first pulse signal and the second pulse signal which are generated by the control unit 10 is shown in FIG. 2. In FIG. 2, the second pulse signal lags behind the first pulse signal just by one t, and in other embodiments, the second pulse signal may lag behind the first pulse signal by more than one t.

At the moment when each pulse of the first pulse signal arrives, the continuous light laser device 12 changes the frequency of its output continuous light according to the frequency change driving signal generated by the driving unit 11. When the frequency change driving signal is applied to the continuous light laser device 12, the continuous light laser device 12 cannot reach a stable output state immediately, and it takes a light source adjustment time t to stably output the continuous light of a frequency corresponding to a specific frequency change driving signal. During the light source adjustment time t, the continuous light laser device 12 is in an unstable output state, a frequency of the continuous light output at each time point is uncertain, and the output continuous light includes multiple frequency components, as shown in FIG. 2, where strip grids indicate that the continuous light output by the continuous light laser device 12 includes multiple frequency components. After the light source adjustment time t, the continuous light laser device 12 reaches a stable output state, and the continuous light output at this time has a single frequency component and a stable frequency. The continuous light laser device 12 does not enter the unstable output state again until a different frequency change driving signal is applied to the continuous light laser device 12. As shown in FIG. 2, when the first pulse of the first pulse signal arrives, the continuous light laser device 12 starts to change the frequency of the output continuous light, and after a light source adjustment time t, the frequency of its output continuous light remains at f1 until the second pulse of the first pulse signal arrives. It should be noted that, the frequency f1 of the continuous light is determined by the frequency change driving signal applied to the continuous light laser device 12, and the value of the frequency change driving signal decides the frequency of the continuous light of the continuous light laser device in the stable output state.

The second pulse signal is specifically used to control the probe pulse generating unit 13 to perform OOK modulation on the continuous light output by the continuous light laser device 12, so that the probe pulse generated by the probe pulse generating unit 13 has a same waveform as a waveform of the second pulse signal. The second pulse signal lags behind the first pulse signal by one light source adjustment time t, and therefore just dodges the unstable output period of the continuous light laser device 12. The probe pulse obtained at this time is an optical wave of a single frequency component, as shown in FIG. 2, where a probe pulse of a frequency f1 is obtained corresponding to the first pulse of the second pulse signal, a probe pulse of a frequency f2 is obtained corresponding to the second pulse, and a probe pulse of a frequency f3 is obtained corresponding to the third pulse.

Figure 3:
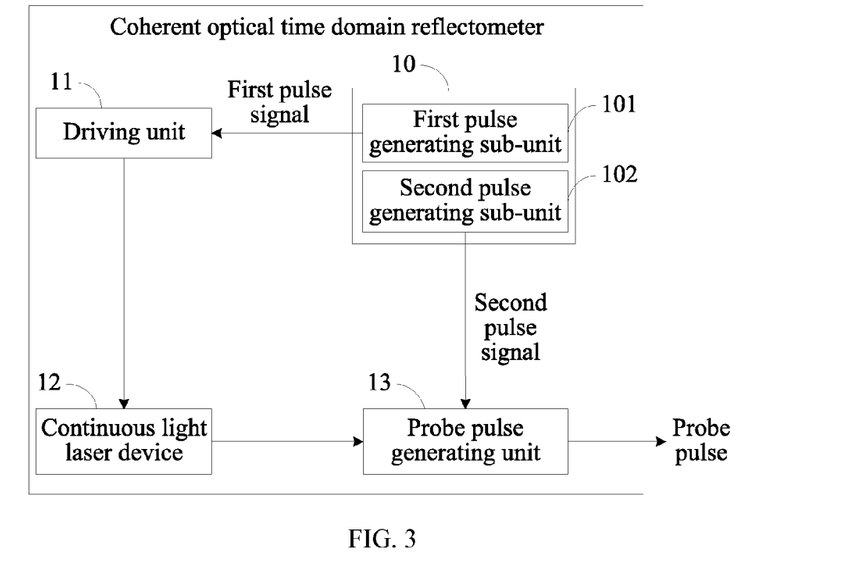
FIG. 3 is a structural diagram of a coherent optical time domain reflectometer according to a second embodiment of the present invention.

An embodiment of the present invention provides another coherent optical time domain reflectometer, a structure of which is as shown in FIG. 3. In comparison with the coherent optical time domain reflectometer of the structure shown in FIG. 1, the difference lies in that, a control unit 10 includes a first pulse generating sub-unit 101 and a second pulse generating sub-unit 102.

The first pulse generating sub-unit 101 generates a first pulse signal, and inputs the first pulse signal to a driving unit 11. The second pulse generating sub-unit 102 generates a second pulse signal, and provides the second pulse signal for a probe pulse generating unit 13.

Figure 4:
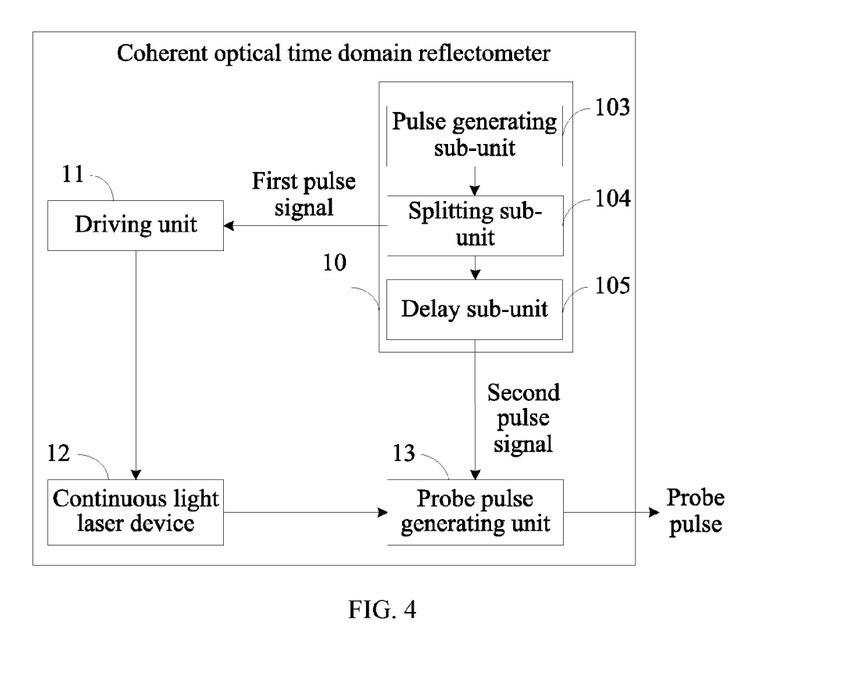
FIG. 4 is a structural diagram of a coherent optical time domain reflectometer according to a third embodiment of the present invention.

An embodiment of the present invention provides further another coherent optical time domain reflectometer, a structure of which is as shown in FIG. 4. In comparison with the coherent optical time domain reflectometer having the structure shown in FIG. 1, the difference lies in that, a control unit 10 includes a pulse generating sub-unit 103, a splitting sub-unit 104 and a delay sub-unit 105.

The pulse generating sub-unit 103 generates a first pulse signal and inputs the first pulse signal to the splitting sub-unit 104. The splitting sub-unit 104 splits the first pulse signal into two paths, where one path is directly input to a driving unit 11, and the other path is input to the delay sub-unit 105. The delay sub-unit 105 delays the first pulse signal to obtain a second pulse signal, and provides the second pulse signal for a probe pulse generating unit 13.

Figure 5:
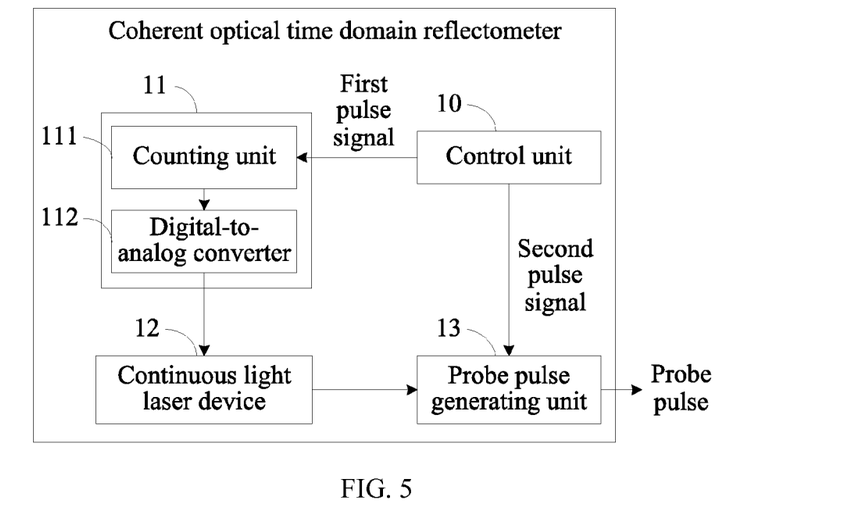
FIG. 5 is a structural diagram of a coherent optical time domain reflectometer according to a fourth embodiment of the present invention.

An embodiment of the present invention provides still another coherent optical time domain reflectometer, a structure of which is as shown in FIG. 5. In comparison with the coherent optical time domain reflectometer having the structure shown in FIG. 1, the difference lies in that, a driving unit 11 includes a counting unit 111 and a digital-to-analog converter 112.

The counting unit 111 performs pulse counting on a first pulse signal. The digital-to-analog converter 112 performs digital-to-analog conversion on a counting result of the counting unit 111 to obtain an analog signal, that is, a frequency change driving signal.

The counting unit 111 may be implemented by a counter, such as a quaternary counter, an octal counter, or a hexadecimal counter, which is not limited in this application. For example, in an embodiment, the counting unit 111 is implemented by a hexadecimal counter, and the counting unit 111 outputs 16 results of 0, 1, 2, . . . , 15. The digital-to-analog converter 112 converts the foregoing 16 numerical values to analog signals, and linear conversion may be adopted during conversion, for example, each result is multiplied by a fixed analog, and in this case, the signal output by the digital-to-analog converter 112 changes linearly. The digital-to-analog converter 112 may also adopt non-linear conversion during the digital-to-analog conversion, for example, may convert a digital signal, which is output by the counting unit, into an analog signal that changes in a sine manner or changes in cosine manner.

When the frequency change driving signal output by the digital-to-analog converter 112 changes in a linear manner or changes in a sine manner or changes in a cosine manner, the frequency of the continuous light which is output by the continuous light laser device 12 under the control of the frequency change driving signal also changes in the linear manner or changes in the sine manner or changes in the cosine manner accordingly.

Figure 6:
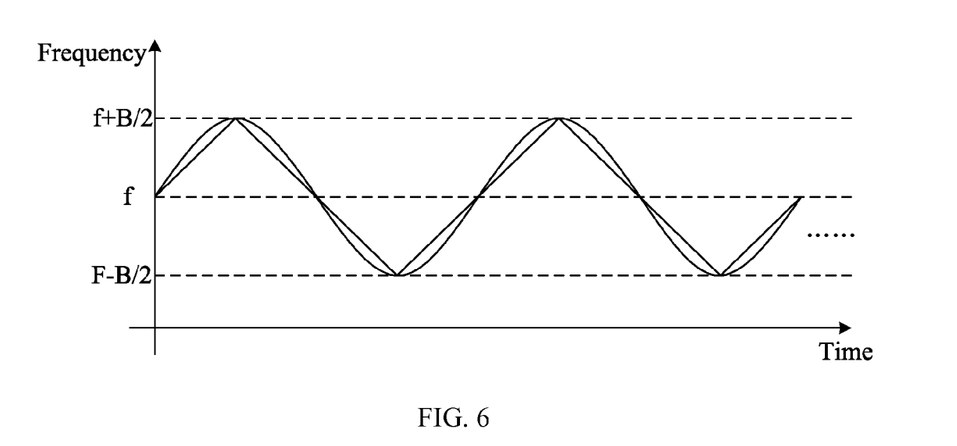
FIG. 6 is a schematic diagram of frequency change of continuous light according to an embodiment of the present invention.

It should be noted that, the probe pulse generating unit 13 in the foregoing embodiments modulates the continuous light output by the continuous light laser device 12, and generates the probe pulse, and the probe pulse needs to be coupled into the fiber to be detected, so as to implement fault detection. Therefore, when a fiber path to be detected includes a filter, it needs to be considered whether the frequency of the continuous light falls within a bandwidth range of the filter on the fiber path to be detected. If the frequency of the continuous light is beyond a bandwidth range of a line filter on the fiber path to be detected, the probe pulse is regarded as a noise and filtered out by the line filter, and thereby, the fault detection cannot be implemented. Therefore, the frequency change driving signal output by the driving unit 11 needs to control the continuous light laser device 12, to make the frequency of its output continuous light change within the bandwidth range of the line filter, as shown in FIG. 6, where B is the bandwidth of the line filter on the path where the fiber to be detected is located, and f is an intrinsic center frequency of the continuous light laser device 13, that is, a center frequency of the continuous light output by the continuous light laser device without any modulation. The bandwidth B of the line filter is determined according to the specification of the filter on the path where the fiber to be detected is located, for example, if the path where the fiber to be detected is located includes multiple filters, an intersection of bandwidths of the multiple filters is taken as the bandwidth B of the line filter.

The driving units 11 of the coherent optical time domain reflectometers of the structures shown in FIG. 3 and FIG. 4 may also adopt the implementation structure of the driving unit of the coherent optical time domain reflectometer of the structure shown in FIG. 5.

Figure 7:
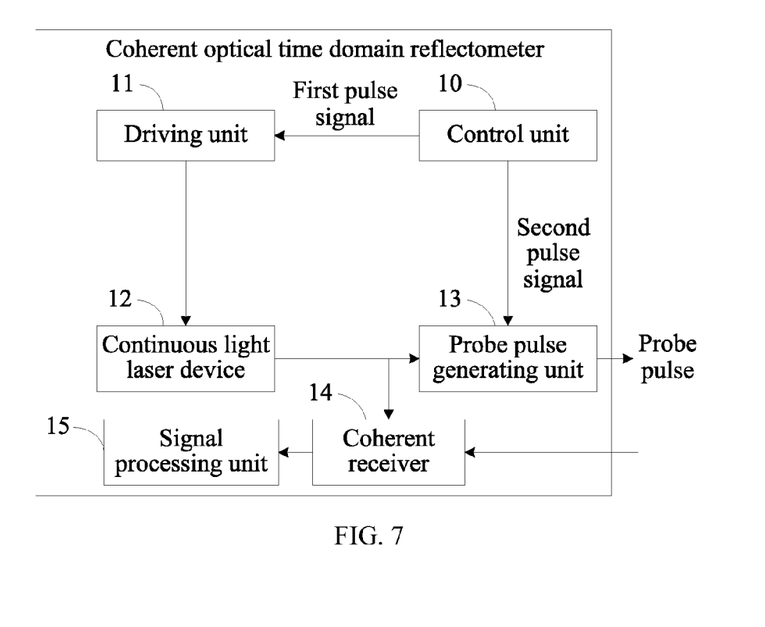
FIG. 7 is a structural diagram of a coherent optical time domain reflectometer according to a fifth embodiment of the present invention.

An embodiment of the present invention provides yet still another coherent optical time domain reflectometer, a structure of which is as shown in FIG. 7. In comparison with the coherent optical time domain reflectometer having the structure shown in FIG. 1, the difference lies in that, a coherent receiver 14 and a signal processing unit 15 are further included. In the coherent optical time domain reflectometer, continuous light output by a continuous light laser device 12 is further provided for the coherent receiver 14 as local oscillation light. The coherent receiver 14 receives an optical signal scattered and/or reflected back from a detected fiber, and performs coherent reception on the reflected or scattered optical signal and the continuous light output by the continuous light laser device 12 and converts the optical signal and the continuous light into an electric signal. The signal processing unit 15 performs signal processing on the electric signal to obtain a Rayleigh-scattered signal and/or an end-face reflected signal. During the probe pulse, the optical signal sent by the coherent optical time domain reflectometer undergoes Rayleigh scattering to form the Rayleigh-scattered signal when passing through each point of the fiber, and undergoes end-face reflection at a fiber splicing position, connection position and fiber-cut position to form the end-face reflected signal. During a propagation process of the Rayleigh-scattered signal and the end-face reflected signal toward the coherent optical time domain reflectometer along the fiber, due to the influence of various noises, the optical signal received by the coherent optical time domain reflectometer not only includes the Rayleigh-scattered signal and/or the end-face reflected signal, but also includes various noises. Therefore, the signal processing unit 15 is required to process the electric signal obtained by the coherent receiver 14, to extract the Rayleigh-scattered signal and/or the end-face reflected signal from the electric signal, so that subsequent fiber state analysis is performed according to the extracted Rayleigh-scattered signal and/or end-face reflected signal. Detailed working processes of the coherent receiver 14 and the signal processing unit 15 belong to the prior art, and is described in detail in this application.

It should be noted that, the coherent optical time domain reflectometers of the structures shown in FIG. 3, FIG. 4 and FIG. 5 may further include the coherent receiver 14 and the signal processing unit 15.

In the coherent optical time domain reflectometers of the structures shown in FIG. 1, FIG. 3, FIG. 4, FIG. 5 and FIG. 7, the control unit may generate the pulse signal through an FPGA (Field Programmable Gate Array, field programmable gate array), a CPLD (Complex Programmable Logic Device, complex programmable logic device) or a DSP (Digital Signal Processor, digital signal processor) in a digital logic manner. Definitely, the control unit may also generate the pulse signal through a circuit formed by analog devices. The counting unit involved in FIG. 5 may also implement the counting function through the FPGA, CPLD or DSP in a digital logic manner, or implement the counting function through analog devices.

Through the coherent optical time domain reflectometer provided in the embodiment of the present invention, the frequency of the continuous light output by the continuous light laser device is controlled, which makes each probe pulse include an optical wave of a single frequency component while optical waves of different probe pulses have different frequencies, rather than makes the probe pulse, which is output by the continuous light laser device, include optical waves of different frequency components. The period T of the first pulse signal and of the second pulse signal is controlled to satisfy $T \geq t + 2L/C$, which makes a next probe pulse be sent after scattered and/or reflected optical signal corresponding to one probe pulse returns to the coherent optical time domain reflectometer, and thereby prevents superposition of scattering and/or optical signals corresponding to different probe pulses. Therefore, the coherent fading noise is effectively reduced, and meanwhile broadening of the frequency spectrum of the optical wave output by the continuous light laser device is not caused, which greatly improves the fiber fault resolution and location accuracy of the coherent optical time domain reflectometer. When the second pulse signal generated by the control unit in the coherent optical time domain reflectometer provided in this embodiment lags behind the first pulse signal by at least one light source adjustment time t, the probe pulse generating unit modulates the continuous light output by the continuous light laser device in the stable output state, and generates the probe pulse, so that the coherent fading noise is further reduced, and the performance of the coherent optical time domain reflectometer is improved.

Figure 8:
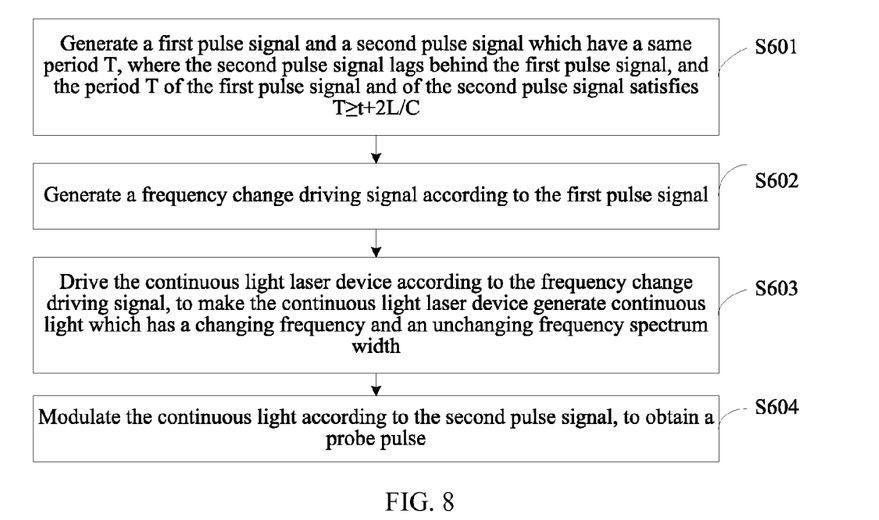
FIG. 8 is a schematic flow chart of a method for generating a probe pulse according to an embodiment of the present invention.

An embodiment of the present invention further provides a method for generating a probe pulse, a procedure of which is shown in FIG. 8, including:

Step S601: Generate a first pulse signal and a second pulse signal which have a same period T, where the second pulse signal lags behind the first pulse signal, and the period T of the first pulse signal and of the second pulse signal satisfies $T \geq t + 2L/C$, where L is a length of a fiber to be detected, C is a propagation velocity of an optical wave in the fiber, and t is a light source adjustment time of a continuous light laser device. The light source adjustment time is time spent by a laser device from stably outputting light of one frequency to stably outputting light of another frequency, and is an intrinsic description parameter of each laser device.

In this step, the generated first pulse signal is a source for controlling a frequency of continuous light output by a continuous light laser device in a coherent optical time domain reflectometer, and the generated second pulse signal is used to perform modulation control on the continuous light output by the continuous light laser device in the coherent optical time domain reflectometer, to generate a probe pulse.

In this step, the first pulse signal and the second pulse signal may be generated by two independent pulse sources separately. Alternatively, a pulse source may first generate the first pulse signal, and then the first pulse signal is split into two paths, and the second pulse signal may be obtained by delaying one of the paths for a preset time.

When a signal is applied to the continuous light laser device to perform adjustment control on the frequency of its output continuous light, it takes a period of time for the continuous light laser device to reach a stable output state. Therefore, in this step, the second pulse signal may also be specifically controlled to lag behind the first pulse signal by at least one t.

Step S602: Generate a frequency change driving signal according to the first pulse signal.

The frequency change driving signal generated in this step is applied to the continuous light laser device to control the frequency of its output continuous light. As long as the frequency change driving signal becomes different, the frequency of the continuous light output by the laser device can be made different. Therefore, each time a pulse of the first pulse signal is received, the frequency change driving signal output currently is changed, so that the output frequency change driving signal may be changed regularly, for example, the frequency change driving signal may be made to change in a linear manner or change in a sine manner or change in a linear saw-tooth manner, or the output frequency change driving signal may also be changed randomly.

In a specific embodiment, this step may further specifically include performing pulse counting on the first pulse signal, and performing digital-to-analog conversion on a pulse counting result to obtain the frequency change driving signal.

When the digital-to-analog conversion is performed on the pulse counting result, the result may be converted to the frequency change driving signal that changes regularly, or the result may be converted to the frequency change driving signal that changes randomly. When the frequency change driving signal changes regularly, the frequency of the continuous light which is output by the continuous light laser device as driven by the frequency change driving signal also changes regularly accordingly. When the frequency change driving signal changes randomly, the frequency of the continuous light which is output by the continuous light laser device as driven by the frequency change driving signal also changes randomly accordingly.

Step S603: Drive the continuous light laser device according to the frequency change driving signal, to make the continuous light laser device generate continuous light which has a changing frequency and an unchanging frequency spectrum width.

Because the frequency change driving signal is changed as triggered by the first pulse signal, that is, when a pulse of the first pulse signal is detected, the frequency change driving signal which generated as triggered by a previous pulse is changed, and the changed frequency change driving signal remains unchanged until the arrival of a next pulse of the first pulse signal. Therefore, in a period of the first pulse signal, the continuous light which is output by the continuous light laser device in a stable state has a single frequency and an unchanging frequency spectrum width, while corresponding to different periods of the first pulse signal, the continuous light output by the continuous light laser device has different frequencies.

In this step, by changing the temperature of the laser device, the current/voltage of a driving circuit or the length of a resonant cavity of the laser device, the frequency change driving signal makes the frequency of the continuous light, which is output by the laser device, change.

In a specific embodiment, as the output of the continuous light laser device is driven by a specific frequency change driving signal, the frequency of the continuous light output by the continuous light laser device changes in a linear saw-tooth manner or changes in a sine manner, as shown in FIG. 6.

Step S604: Modulate the continuous light according to the second pulse signal, to obtain a probe pulse.

In this step, when the continuous light is modulated according to the second pulse signal, a simple OOK modulation scheme may be adopted. In addition, the second pulse signal decides time with and without light, or time with high optical power and low optical power in a modulation period.

The probe pulse generated in the embodiment of the present invention is coupled into the fiber to be detected, so as to implement fault detection. Therefore, when a fiber path to be detected includes a filter, it needs to be considered whether the frequency of the continuous light generated by the continuous light laser device falls within a bandwidth range of a line filter on the fiber path to be detected. If the frequency of the continuous light is beyond the bandwidth range of the line filter on the fiber path to be detected, the probe pulse is regarded as a noise and filtered out by the line filter, and thereby, the fault detection cannot be implemented. Therefore, during specific implementation of step S603, while driving the continuous light laser device, the frequency change driving signal may specifically control the frequency of the continuous light output by the continuous light laser device to be within an interval [f+B/2, f−B/2], as shown in FIG. 6, where B is a bandwidth of the line filter on the path where the fiber to be detected is located, and f is an intrinsic center frequency of the continuous light laser device, that is, a center frequency of the continuous light output by the continuous light laser device without any modulation. The bandwidth B of the line filter is determined according to the specification of the filter on the path where the fiber to be detected is located, for example, if the path where the fiber to be detected is located includes multiple filters, an intersection of bandwidths of the multiple filters is taken as the bandwidth B of the line filter.

The method for generating a probe pulse signal provided in the embodiment of the present invention may further include: splitting a part of light from the continuous light generated in step S603, performing coherent reception on the split part of the continuous light and an optical signal which is scattered or reflected back from the fiber, to obtain an electric signal; and performing signal processing on the electric signal, to obtain a Rayleigh-scattered signal and/or an end-face reflected signal.

At the time of generating the probe pulse in the embodiment of the present invention, the frequency of the continuous light output by the continuous light laser device is controlled, which makes each probe pulse include an optical wave of a single frequency component while optical waves of different probe pulses have different frequencies, rather than makes the probe pulse, which is output by the continuous light laser device, include optical waves of different frequency components. The period T of the first pulse signal and of the second pulse signal is controlled to satisfy T≥t+2L/C, which makes a next probe pulse be sent after scattered and/or reflected optical signals corresponding to one probe pulse return to the coherent optical time domain reflectometer, and thereby prevents superposition of scattering and/or optical signals corresponding to different probe pulses. Therefore, the coherent fading noise is effectively reduced, and meanwhile broadening of the frequency spectrum of the optical wave output by the continuous light laser device is not caused. When the second pulse signal lags behind the first pulse signal by at least one light source adjustment time t in this embodiment, the continuous light which is output by the continuous light laser device in the stable output device is modulated and the probe pulse is generated, so that the coherent fading noise is further reduced.

What are described above are only exemplary implementation manners of the present invention, but not intended to limit the protection scope of the present invention. Any change or replacement that can be easily thought of by persons skilled in the art within the technical scope disclosed in the present invention shall fall within the protection scope of the present invention. Therefore, the protection scope of the present invention shall be subject to the protection scope of the claims.

What is claimed is:

1. An apparatus for performing coherent optical time domain reflectometry, the apparatus comprising:
    a control unit configured to generate a first pulse signal and a second pulse signal which have a common period (T), wherein the second pulse signal lags behind the first pulse signal, wherein the common period (T) satisfies T≥t+2L/C, wherein t is a light source adjustment time of a continuous light laser device, L is a length of a fiber to be detected, and C is a propagation velocity of an optical wave in the fiber;
    a driving unit configured to generate a frequency change driving signal according to the first pulse signal;
    the continuous light laser device configured to generate continuous light having a time-varying frequency and a frequency spectrum width that remains constant, wherein the continuous light laser device is driven by the frequency change driving signal; and
    a probe pulse generating unit configured to generate a probe pulse by modulating the continuous light according the second pulse signal.

2. The apparatus according to claim 1, wherein the second pulse signal lags behind the first pulse signal by at least one light source adjustment time (t).

3. The apparatus according to claim 1, wherein the control unit specifically comprises:
 a first pulse generating sub-unit configured to generate the first pulse signal; and
 a second pulse generating sub-unit configured to generate the second pulse signal.

4. The apparatus according to claim 1, wherein the control unit specifically comprises:
 a pulse generating sub-unit configured to generate the first pulse signal;
 a splitting sub-unit configured to split the first pulse signal into two paths, thereby obtaining two paths; and
 a delay sub-unit configured to obtain the second pulse signal by delaying one of the two paths obtained by splitting the first pulse signal.

5. The apparatus according to claim 1, wherein the control unit comprises:
 a counting unit configured to perform pulse counting on the first pulse signal; and
 a digital-to-analog converter configured to obtain the frequency change driving signal by performing digital-to-analog conversion on a counting result of the counting unit.

6. The apparatus according to claim 5, further comprising:
 a coherent receiver configured to receive an optical signal that is scattered or reflected back from the fiber, and to perform coherence processing on the optical signal and the continuous light to obtain an electric signal; and
 a signal processing unit configured to perform signal processing on the electric signal to obtain at least one of a Rayleigh-scattered signal and an end-face reflected signal.

7. A method for generating a probe pulse, the method comprising:
 generating a first pulse signal and a second pulse signal which have a common period T, wherein the second pulse signal lags behind the first pulse signal, and the period T of the first pulse signal and of the second pulse signal satisfies $T \geq t+2L/C$, wherein t is a light source adjustment time of a continuous light laser device, L is a length of a fiber to be detected, and C is a propagation velocity of an optical wave in the fiber;
 generating a frequency change driving signal according to the first pulse signal;
 generating continuous light by driving the continuous light laser device in accordance with the frequency change driving signal, wherein the continuous light has a time-varying frequency and a frequency spectrum width that remains constant; and
 modulating the continuous light according to the second pulse signal to obtain a probe pulse.

8. The method according to claim 7, wherein the second pulse signal lags behind the first pulse signal by at least one light source adjustment time (t).

9. The method according to claim 7, wherein the time-varying frequency of the continuous light varies in a linear saw-tooth or sinusoidal manner.

10. The method according to claim 7, wherein time-varying frequency of the continuous light has a frequency interval of $[f+B/2, f-B/2]$, where f is an intrinsic center frequency of the continuous light laser device, and B is a bandwidth of a line filter in a fiber path to be detected.

11. The method according to claim 7, wherein generating continuous light by driving the continuous light laser device in accordance with the frequency change driving signal comprises:
 performing pulse counting on the first pulse signal to obtain a pulse counting result; and
 performing digital-to-analog conversion on the pulse counting result to obtain the frequency change driving signal.

12. The method according to claim 11, further comprising:
 receiving an optical signal that is scattered or reflected back from the fiber;
 splitting the continuous light to obtain a portion of light, and performing coherence processing on the portion of light and the optical signal to obtain an electric signal; and
 performing signal processing on the electric signal to obtain at least one of a Rayleigh-scattered signal and an end-face reflected signal.

* * * * *